US012676044B1

(12) United States Patent
Mainiero

(10) Patent No.: US 12,676,044 B1
(45) Date of Patent: Jul. 7, 2026

(54) CLOUD-BASED VENDING CONTROL SYSTEM AND METHOD

(71) Applicant: Wesco Digital Solutions (Ireland) Limited, Dublin (IE)

(72) Inventor: Andrea Mainiero, Pennsburg, PA (US)

(73) Assignee: Wesco Digital Solutions (Ireland) Limited, Dublin (IE)

( * ) Notice: Subject to any disclaimer, the term of this patent is extended or adjusted under 35 U.S.C. 154(b) by 0 days.

(21) Appl. No.: 19/269,984

(22) Filed: Jul. 15, 2025

(51) Int. Cl.
*G07F 9/00* (2006.01)
*G06Q 10/087* (2023.01)
*G07F 17/00* (2006.01)

(52) U.S. Cl.
CPC ....... *G07F 9/002* (2020.05); *G06Q 10/08772* (2025.08); *G07F 9/001* (2020.05)

(58) Field of Classification Search
CPC .... G07F 9/002; G07F 9/001; G06Q 10/08772
USPC .......................................................... 700/236
See application file for complete search history.

(56) References Cited

U.S. PATENT DOCUMENTS

2010/0017023 A1* 1/2010 Jacomet .................. G07F 11/54
                                                    700/236
2017/0092034 A1* 3/2017 Want ...................... G06Q 20/18

2018/0137461 A1* 5/2018 Wilkinson ......... G06Q 10/0836
2018/0276674 A1* 9/2018 Ramatchandirane .. G06Q 20/18
2019/0272698 A1* 9/2019 Shimmerlik .............. G07F 9/10
2020/0019949 A1* 1/2020 Simmons ............. G06Q 10/087
2021/0326948 A1* 10/2021 Shah ......................... G07F 11/62
2022/0180710 A1* 6/2022 Kütt ...................... G06Q 10/087
2023/0267411 A1* 8/2023 O'Connor .............. G01G 19/52
                                                    705/28
2023/0401529 A1* 12/2023 Wang ................. G06Q 30/0635
2025/0299525 A1* 9/2025 Dobbins ................ G07D 11/34

FOREIGN PATENT DOCUMENTS

WO      WO-2023183398 A1 * 9/2023 ............... G07F 9/00

* cited by examiner

*Primary Examiner* — Jacob S. Scott
*Assistant Examiner* — Michael E Butler
(74) *Attorney, Agent, or Firm* — K&L Gates LLP

(57) ABSTRACT

The present disclosure provides a cloud-based vending control system including a cloud-based server to communicate with one or more remote dispensing devices over a network, each dispensing device comprising a control circuit coupled to a memory storing a unique identifier associated with a dispensing mechanism and dispensing device type. The cloud-based server is operable to obtain the unique identifier from a dispensing device, associate the unique identifier with a customer account and the dispensing device, receive a dispensing request initiated by a user via a mobile or web-based interface, the dispensing request includes a selection of an inventory item, transmit operational instructions to the control circuit of the dispensing device to actuate the dispensing mechanism for releasing the selected inventory item stored in the dispensing device, and receive a confirmation signal indicating completion of the dispensing.

20 Claims, 6 Drawing Sheets

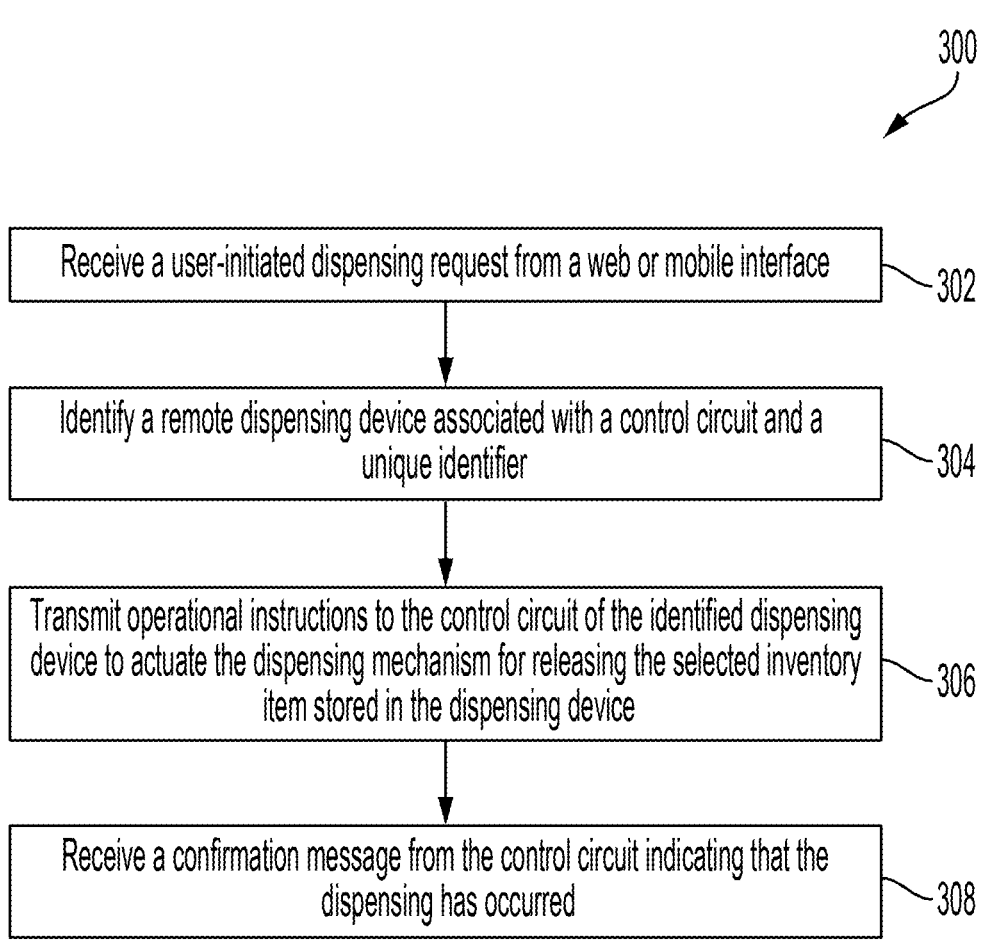

300

Receive a user-initiated dispensing request from a web or mobile interface ⎯302

Identify a remote dispensing device associated with a control circuit and a unique identifier ⎯304

Transmit operational instructions to the control circuit of the identified dispensing device to actuate the dispensing mechanism for releasing the selected inventory item stored in the dispensing device ⎯306

Receive a confirmation message from the control circuit indicating that the dispensing has occurred ⎯308

FIG. 3

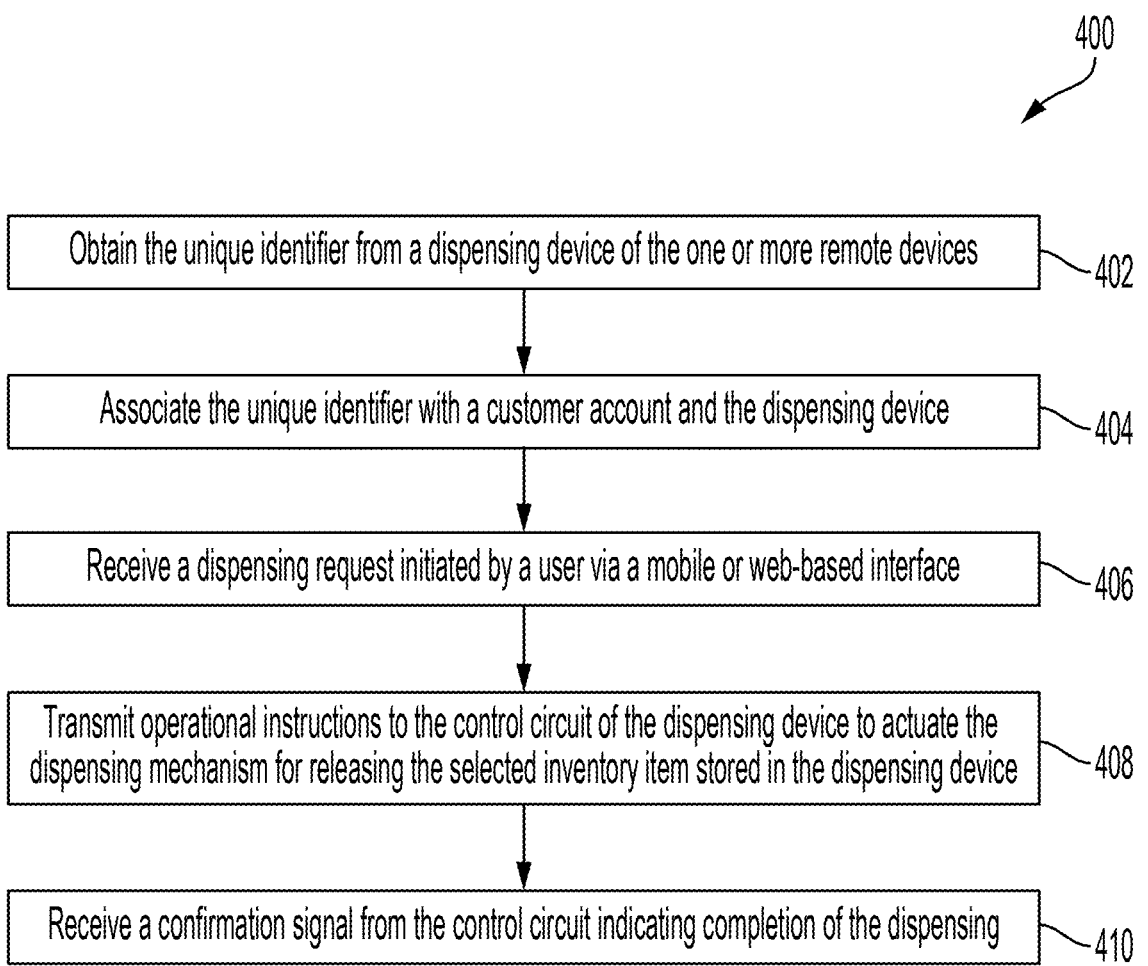

400

Obtain the unique identifier from a dispensing device of the one or more remote devices ⟋402

Associate the unique identifier with a customer account and the dispensing device ⟋404

Receive a dispensing request initiated by a user via a mobile or web-based interface ⟋406

Transmit operational instructions to the control circuit of the dispensing device to actuate the dispensing mechanism for releasing the selected inventory item stored in the dispensing device ⟋408

Receive a confirmation signal from the control circuit indicating completion of the dispensing ⟋410

FIG. 4

CLOUD-BASED VENDING CONTROL SYSTEM AND METHOD

BACKGROUND

Technical Field

The present disclosure relates to vending machines and inventory control, and more specifically to systems and methods for remotely controlling vending machines using cloud-hosted software and modular firmware deployed on embedded computing devices.

Discussion of Art

Conventional vending systems typically rely on localized computing resources embedded directly within the vending equipment. These systems often include on-board databases, touchscreens, and complex interfaces. They are inherently limited in flexibility, remote management, and scalability.

SUMMARY

In one aspect, the present disclosure provides a cloud-based vending control system, comprising: a cloud-based server to communicate with one or more remote dispensing devices over a network, each dispensing device comprising a control circuit coupled to a memory storing a unique identifier associated with a dispensing mechanism and dispensing device type, wherein the cloud-based server is operable to: obtain the unique identifier from a dispensing device of the one or more remote devices; associate the unique identifier with a customer account and the dispensing device; receive a dispensing request initiated by a user via a mobile or web-based interface, wherein the dispensing request comprises a selection of an inventory item; transmit operational instructions to the control circuit of the dispensing device to actuate the dispensing mechanism for releasing the selected inventory item stored in the dispensing device; and receive a confirmation signal from the control circuit indicating completion of the dispensing.

In one aspect, the cloud-based server comprises: a database to store data related to the inventory item.

In one aspect, the cloud-based server is operable to: receive feedback from the control circuit; determine, based on the feedback, that the selected inventory item has been removed from the dispensing device; and update the database for the inventory item.

In one aspect, the cloud-based vending control system comprises a feedback circuit located on the dispensing device, wherein the feedback circuit comprises: a sensor, RFID, or user input is operable to detect that the selected inventory item was removed from the dispensing device.

In one aspect, the actuation of the dispensing mechanism comprises: dispensing the inventory item; or unlocking a door to provide access to the inventory item.

In one aspect, the cloud-based server is operable to: determine that the inventory item is not dispensed, wherein the determination is based on a mismatch of inventory in the dispensing device and inventory stored in the database; and based on the mismatch of inventory, locking the dispensing device.

In one aspect, the cloud-based server is operable to host the user interface accessible via a mobile device or web browser to allow users to initiate dispensing requests from remote locations.

In one aspect, the cloud-based server is operable to provision the dispensing device by associating the unique identifier with the dispensing device type, selected from the group of a locker, helix-style machine, or drawer cabinet.

In one aspect, the present disclosure provides a cloud-based method for dispensing inventory items using remote dispensing devices, the method comprising: receiving, at a cloud-based server, a user-initiated dispensing request from a web or mobile interface, wherein the dispensing request includes a selected inventory item; identifying a remote dispensing device associated with a control circuit and a unique identifier, wherein the dispensing device comprises a control circuit coupled to a memory storing a unique identifier associated with a dispensing mechanism and machine type; transmitting, from the cloud-based server to the identified dispensing device, operational instructions to the control circuit of the identified dispensing device to actuate the dispensing mechanism for releasing the selected inventory item stored in the dispensing device; and receiving, at the cloud-based server, a confirmation message from the control circuit indicating that the dispensing has occurred.

In one aspect, the method comprises maintaining, at the cloud-based server, inventory data corresponding to each dispensing device; monitoring usage data received from each of the control circuits; and generating a reorder trigger when a depletion threshold is reached.

In one aspect, generating the reorder trigger comprises: executing a machine learning model at the cloud-based server, wherein the machine learning model is trained using historical inventory and usage data to forecast reorder timing based on at least one of: item lead time, consumption rate, current stock level, customer classification, or distributor inventory availability.

In one aspect, the method comprises receiving transaction data from a dispensing device upon restoration of network connectivity, wherein the transaction data is generated during offline operations and stored locally by a hardware controller in the dispensing device; and updating central inventory records based on the received transaction data; and wherein the dispensing device comprises a scanner operable to interpret machine-readable codes representing dispensing instructions.

In one aspect, the present disclosure provides a cloud-based vending control system, comprising: a cloud-based server to communicate with a remote dispensing device over a network; the remote dispensing device comprising: a dispensing mechanism; a memory storing a unique identifier associated with the dispensing mechanism and dispensing device type; a control circuit coupled to the memory, wherein the control circuit is operable to: execute operational instructions from the cloud-based server; wherein the cloud-based server is operable to: obtain the unique identifier from the dispensing device; associate the unique identifier with a customer account and the dispensing device; receive a dispensing request initiated by a user via a mobile or web-based interface, wherein the dispensing request comprises a selection of an inventory item; transmit operational instructions to the control circuit of the dispensing device to actuate the dispensing mechanism for releasing the selected inventory item stored in the dispensing device; and receive a confirmation signal from the control circuit indicating completion of the dispensing.

In one aspect, the cloud-based server comprises: a database to store data related to the inventory item.

In one aspect, the remote dispensing device comprises a feedback circuit; and wherein the cloud-based server is operable to: receive feedback from the feedback circuit;

determine, based on the feedback, that the selected inventory item has been removed from the dispensing device; and update the database for the inventory item.

In one aspect, the feedback circuit comprises: a sensor, RFID, or user input is operable to detect that the selected inventory item was removed from the dispensing device.

In one aspect, the actuation of the dispensing mechanism comprises: dispensing the inventory item; or unlocking a door to provide access to the inventory item.

In one aspect, the cloud-based server is operable to: determine that an inventory item is not dispensed, wherein the determination is based on a mismatch of inventory in the dispensing device and inventory stored in the database; and based on the mismatch of inventory, locking the dispensing device.

In one aspect, the cloud-based server is operable to host the user interface accessible via a mobile device or web browser to allow users to initiate dispensing requests from remote locations.

In one aspect, the cloud-based server is operable to provision the dispensing device by associating the unique identifier with the dispensing device type, selected from the group of a locker, helix-style machine, or drawer cabinet.

BRIEF DESCRIPTION OF THE DRAWINGS

FIG. 3 illustrates a method for dispensing inventory items using remote devices, according to at least one aspect of the present disclosure.

FIG. 4 illustrates a method for dispensing inventory items using remote devices, according to at least one aspect of the present disclosure.

DETAILED DESCRIPTION

Figure 1:
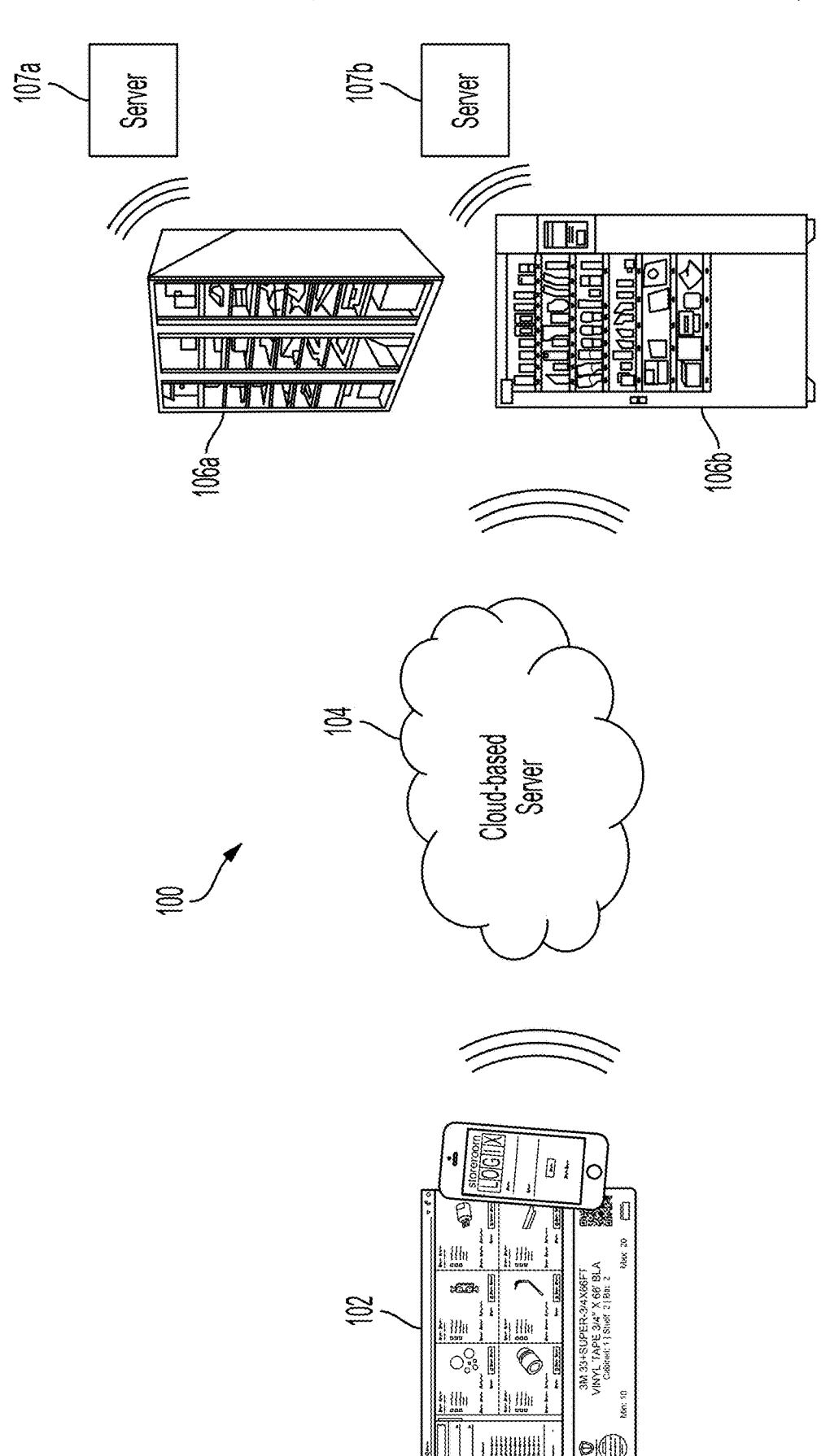
FIG. 1 illustrates a system for cloud-based vending control system, according to at least one aspect of the present disclosure.

Disclosed is a vending control system that uses a cloud-based architecture to remotely operate vending or locker machines using a mobile or web-based interface. Each vending unit may include a microcontroller, such as a Raspberry Pi controller, running firmware developed to receive commands from the cloud and to execute dispensing actions accordingly. The system supports bidirectional communication, remote provisioning, and offline dispensing using a quick response (QR) code or barcode scanning. Improvements over traditional systems include reduced hardware cost, centralized software updates, enhanced inventory tracking, and remote diagnostics.

In the context of the present disclosure, the term "vending machines" encompasses a range of equipment designed to facilitate the distribution and management of inventory and equipment usage at a jobsite. This includes, but is not limited to, industrial vending machines, lockers, drawers, and commercial vending machines. Each of these components plays a critical role in ensuring efficient inventory control and tracking.

Industrial vending machines are robust systems specifically engineered to dispense tools, parts, and other jobsite necessities. These machines are equipped with advanced tracking capabilities that monitor the issuance and return of items, thereby providing real-time data on inventory levels and usage patterns. This functionality is essential for maintaining optimal stock levels and minimizing downtime due to equipment shortages.

Lockers serve as secure storage units within the vending machine category. They are designed to store larger or more valuable items that require restricted access. Each locker is typically equipped with electronic access controls and tracking systems that log user interactions, ensuring accountability and traceability of equipment usage.

Drawers are integrated into vending systems to organize and dispense smaller items such as fasteners, fittings, and other consumables. These drawers often include sensors or radio frequency identification (RFID) technology to track the removal and replenishment of items, providing detailed insights into consumption rates and inventory needs.

Commercial vending machines, while traditionally associated with consumer goods, are adapted in this context to distribute jobsite-specific materials. These machines are equipped with inventory management software that tracks sales and usage, allowing for precise control over stock levels and ensuring that essential items are always available to workers.

Collectively, these vending machines are integral to the efficient operation of a jobsite. They provide a streamlined method for distributing necessary tools and materials while simultaneously tracking inventory and usage. This dual functionality not only enhances productivity but also reduces waste and loss, contributing to overall cost savings and operational efficiency.

In general, vending machines often include a screen and control circuit within the machine to control the vending of items in the vending machine. Each vending unit may comprise a control circuit to communicate with a central cloud platform via a secured network connection. The control circuit stores the instructions for operating the vending machine.

The present disclosure is directed to a cloud-based system in which the instructions for controlling the vending machine are stored in the cloud. The vending machine can interface with a user device, such as a mobile phone or a device with a web browser. The cloud may store instructions for each type of vending machine. The cloud may also store the inventory for each vending machine.

By enabling the cloud to store the instructions and data, the control circuit within the vending machine may be a simple circuit, capable of receiving the instructions and executing them. For example, the control circuit may be a microcontroller. Each control circuit is uniquely identified by a serial number and may be dynamically reassigned to different types of equipment through provisioning software.

Lockers may include drawers that are locked, where the vending machine unlocks the drawer, and the user reaches in to remove the item. Vending machines may include helix vending machines where one item is dispensed at a time, where a coil dispenses the product.

Users interact with the system through a mobile application or browser, selecting items for dispensing. Upon selection, the cloud server transmits a command to the vending unit to actuate the appropriate mechanism. The firmware executes the command, and feedback is sent to the cloud confirming completion of the transaction.

To accommodate scenarios in which network access is unavailable, the vending unit may include a barcode or QR code scanner. When scanned, these codes trigger local firmware operations that dispense items. The control circuit stores the associated transaction data locally and synchronizes with the cloud once connectivity is restored.

An inventory monitoring feature ensures that once usage depletes stock below defined minimum thresholds, replenishment orders are generated. Orders may be triggered in real time or queued for batch submission, optimizing logistics and supply chain operations.

FIG. 1 illustrates a system for cloud-based vending control system, according to at least one aspect of the present disclosure. The vending control system 100 includes a cloud-based server 104 communicates with a remote dispensing device 106a, 106b over a network. The remote dispensing device 106a, 106b may communicate to other networked servers 107a, 107b.

Figure 2:
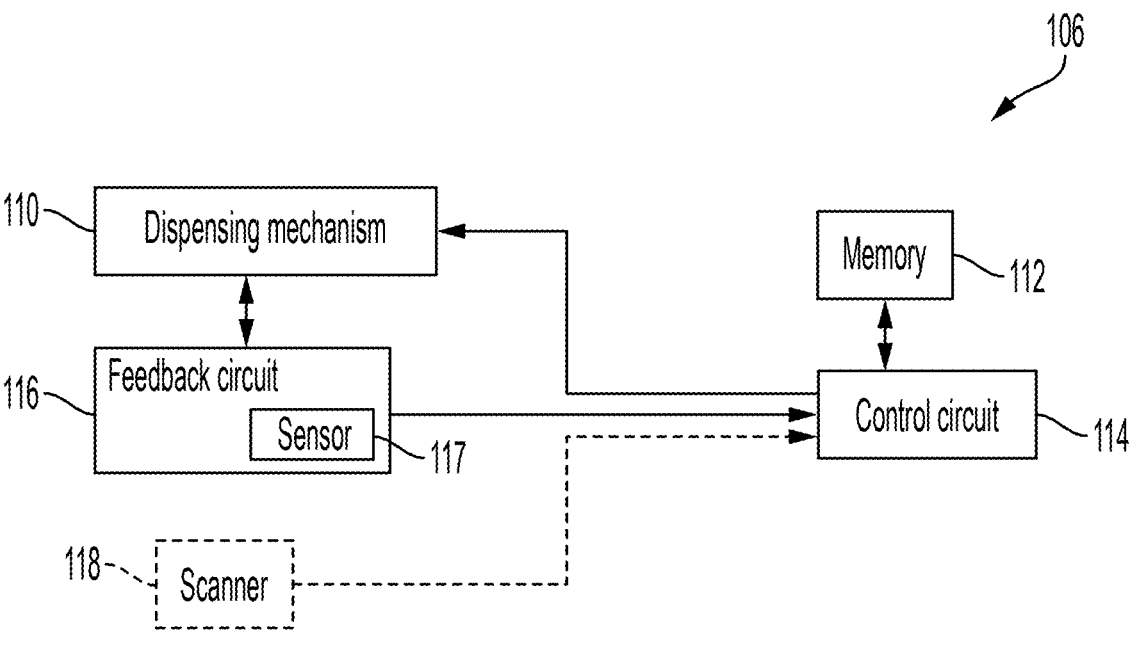
FIG. 2 illustrates a remote dispensing device, according to at least one aspect of the present disclosure.

The remote dispensing device 106 is shown in more detail in FIG. 2. The remote dispensing device 106 includes a dispensing mechanism 110. The dispensing mechanism 110 may be a helix, a lock, a door, etc.

The remote dispensing device 106 may include a memory 112 for storing a unique identifier associated with the dispensing device 106 and machine type associated with the dispensing mechanism. The unique identifier may be used to identify the individual dispensing device 106. The memory may also include a machine type, such as whether the dispensing mechanism is a locker, helix, or drawer vending machine. These identifiers enable the user to choose the individual dispensing device 106 to dispense inventory items from. The identifiers also enable the cloud to determine what type of instructions to choose based on the dispensing mechanism type.

The remote dispensing device 106 may include a control circuit 114 coupled to the memory 112. The control circuit 114 is operable to execute operational instructions from the cloud-based server 104. For example, the cloud-based server 104 is operable to provision the dispensing device 106 by associating the unique identifier with the dispensing device type, selected from the group of a locker, helix-style machine, or drawer cabinet. The cloud-based server 104 sends instructions to the control circuit 114 to operate the dispensing mechanism based on the dispensing mechanism type and the inventory item to be dispensed. For example, instructions on how to dispense a helix dispensing mechanism are different from a locker dispensing mechanism.

In some embodiments, the dispensing device 106 may include a feedback circuit 116 located on the dispensing device 106, wherein the feedback circuit 116 includes a sensor 117 such as, for example, a RFID device. The sensor 117 or user input may be operable to detect that the selected inventory item was removed from the dispensing device 106.

In some embodiments, the dispensing device 106 includes a scanner 118. The scanner 118 may scan codes on inventory items or may be used to trigger local firmware operations that dispense items. The control circuit stores the associated transaction data locally and synchronizes with the cloud once connectivity is restored.

For example, the scanner 118 can be external on the dispensing machine. The external scanner 118 may be operable to scan a code on a user device 102. The user device 102 may display the code to indicate which item to display and include the instructions to dispense the item. For example, the scanner 118 can be internal to the dispensing machine. The internal scanner 118 may be operable to scan the item dispensed for inventory tracking.

Turning back to FIG. 1, in some embodiments, the cloud-based server 104 hosts the user interface accessible via a mobile device or web browser to allow users to initiate dispensing requests from remote locations.

The cloud-based server 104 is operable to obtain the unique identifier from the dispensing device 106. The cloud-based server 104 may obtain the unique identifier from the user who identifies the vending machine to vend from through the user device 102. In another embodiment, the user selects the vending machine, and the server 104 sends a command to the vending machine to send back the unique identifier. In some embodiments, the server 104 associates the unique identifier with a customer account and the dispensing device 106.

The server 104 receives a dispensing request initiated by a user via a mobile or web-based interface. The dispensing request may include a selection of an inventory item. The selection of the inventory item may include more than one item to be released from the vending machine. The dispensing request may include which vending machine to vend from.

In some embodiments, the server 104 may instruct the user which vending machines have the item available and allow the user to choose from the available vending machines. The server 104 may communicate to the user device 102 the available vending machines with the inventory item and the user device 102 may display the available vending machines. The user may select on the user device 102 which vending machine to use.

The user device 102, through information from the server 104, may determine the closest vending machines to the user and suggest a vending machine to vend from based on distance. In another embodiment, the user device 102, using information from the server 104 and an indication from the user on which item to vend, the user device 102 may display vending machines with the item available for the user to choose from.

In another embodiment, the user selects the item to be dispensed, and the server 104 determines which vending machine is closest to the user and instructs the user to use the identified closest vending machine.

The server 104 transmits operational instructions to the control circuit 114 of the dispensing device 106 to actuate the dispensing mechanism for releasing the selected inventory item stored in the dispensing device 106. Since the server 104 knows the vending machine type based on the selected vending machine, the server 104 selects instructions based on the vending machine type. For example, the helix vending machine requires different operational instructions than the locker vending machine. For example, actuation of the dispensing mechanism includes dispensing the inventory item or unlocking a door to provide access to the inventory item.

The server 104 receives a confirmation signal from the control circuit 114 indicating completion of the dispensing. The confirmation signal from the control circuit 114 may be based on a determination that the dispensing was successful.

The control circuit 114 of the vending machine may generate a confirmation signal when the dispensing has been completed. For example, when an inventory item is removed from a drawer, the control circuit 114 may generate the confirmation signal. The control circuit 114 may have a sensor in the drawer to determine whether the drawer was opened, and an item was removed. The sensor may be one of a proximity sensor, an RFID reader, scale, or other similar sensor.

In some embodiments, the cloud-based server 104 receives feedback from the control circuit 114. The cloud-based server 104 may request the feedback from the feedback circuit 116. The feedback circuit 116 may comprise a sensor to determine an item was removed or dispensed. The feedback circuit 116 may send the feedback as the feedback circuit 116 receives signals from a sensor in the feedback circuit 116.

In some embodiments, the server 104 determines, based on the feedback, that the selected inventory item has been removed from the dispensing device 106. For example, the feedback received may indicate that a drawer has been opened, based on a sensor on the drawer. An additional sensor may determine that an item has been removed from the drawer. The sensor may measure weight to determine that an item has been removed, or the sensor may be a proximity sensor to determine that a hand has reached into the drawer. The sensor may be an RFID reader or scanner 118 to determine which item has been removed.

In a helix dispensing device, the sensor may determine the helix has been actuated. In another embodiment, an RFID sensor or scanner 118 may receive information of the item that is removed. In another embodiment, the inventory items stored may be weighed and the weight of the items may be used to determine the number of inventory items.

In some embodiments, the cloud-based server 104 may include a database to store data related to the inventory item. The database may include the number of available items for each inventory item. The cloud-based server 104 may update the database after receiving a dispensing request. In other embodiments, the cloud-based server 104 may update the database after receiving a confirmation from the feedback circuit 116 that the inventory item has been removed. The server 104 may then update the database for the inventory item. The database may be updated based on the feedback received from the feedback circuit 116 in the dispensing device 106.

In some embodiments, the cloud-based server 104 determines that an inventory item is not dispensed. An inventory item may not be dispensed due to error in the dispensing. For example, where the door does not unlock, or the helix does not rotate, the item is not dispensed. In other examples, the wrong door may be unlocked, or the wrong item may be dispensed from the helix. This may occur due to errors in the location of inventory in the machine or mechanical failures within the dispensing device 106.

In some embodiments, the determination is based on a mismatch of inventory in the dispensing device 106 and inventory stored in the database. Based on the mismatch of inventory, the server 104 may send a signal to lock the dispensing device 106 to prevent further dispensing.

In various embodiments, where network access is unavailable, the vending device may include a scanner 118 for a barcode or QR code. When scanned, these codes trigger local firmware operations that dispense items. The control circuit stores the associated transaction data locally and synchronizes with the cloud once connectivity is restored.

In some embodiments, where the network is offline, or the user is unable to send instructions to the vending machine, the user may enable the user device 102 to create a QR code based on data from the server 104. The QR code may then be scanned by the dispensing device 106 and the item may be dispensed. The QR code may include the item and instructions for dispensing.

A method 300 for dispensing inventory items using remote devices is illustrated in FIG. 3. In this embodiment, the method 300 begins with receiving 302 a user-initiated dispensing request through a web or mobile interface. This request specifies the inventory item to be dispensed. The method 300 then identifies 304 a remote dispensing device, which is linked to a control circuit and a unique identifier. Once the device is identified, operational instructions are transmitted 306 to the control circuit of the dispensing device. These instructions activate the dispensing mechanism, allowing the selected inventory item to be released from storage. Finally, the method 300 receives 308 a confirmation message from the control circuit, indicating that the dispensing has successfully occurred.

In the method 300 described, a cloud-based server is responsible for maintaining inventory data for each dispensing device. It monitors usage data received from each control circuit and generates a reorder trigger when a depletion threshold is reached. This process involves executing a machine learning model at the cloud-based server. The model, trained with historical inventory and usage data, forecasts reorder timing based on factors such as item lead time, consumption rate, current stock level, customer classification, or distributor inventory availability.

Additionally, the method 300 includes receiving transaction data from a dispensing device once network connectivity is restored. This transaction data, generated during offline operations, is stored locally by a control circuit within the dispensing device. Upon receiving this data, central inventory records are updated accordingly. The dispensing device is equipped with a scanner capable of interpreting machine-readable codes that represent dispensing instructions.

The method 300 may be implemented with system 100 of FIG. 1. In accordance with the method 300, the cloud-based server 104 receives 302 a user-initiated dispensing request from a web or mobile interface. The dispensing request may include a selected inventory item.

The cloud-based server 104 may identify 304 a remote dispensing device 106 associated with a control circuit 114 and a unique identifier. In one embodiment, the dispensing device 106 may include a control circuit 114 coupled to a memory storing a unique identifier associated with a dispensing mechanism and machine type, such as the dispensing device 106 as shown in FIG. 2.

The cloud-based server 104 may transmit 306, to the identified dispensing device 106, operational instructions to the control circuit 114 of the identified dispensing device 106 to actuate the dispensing mechanism for releasing the selected inventory item stored in the dispensing device 106.

The cloud-based server 104 may receive 308 a confirmation message from the control circuit 114 indicating that the dispensing has occurred. In some embodiments, the method may include, maintaining, at the cloud-based server 104, inventory data corresponding to each dispensing device 106. The inventory may be stored in a database in the cloud. The cloud-based server 104 may monitor usage data received from each control circuit 114. The method may also include generating a reorder trigger when a depletion threshold is reached by the cloud-based server 104.

The reorder trigger may be generated by executing a machine learning model at the cloud-based server 104. The model is trained using historical inventory and usage data to forecast reorder timing based on at least one of item lead time, consumption rate, current stock level, customer classification, or distributor inventory availability.

The reorder trigger may be generated based on a usage rate of inventory. The usage rate may be determined based on a rate at which inventory is depleted, as calculated from inventory stored in the memory. The usage rate may be based on availability of items, such as reusable items all being unavailable during the day. This may indicate that more of those items may be necessary. The reorder quantity may be based on the operational cost of the item. The operational cost may be based on order cost, delivery cost, and material cost.

The reorder trigger may be a minimum value needed to keep in stock. This may be based on lead time and recent usage of the item. The reorder value may be based on both the reorder quantity and the minimum value needed to keep in stock. In some embodiments, these values are determined by a machine learning model. The machine learning model uses historical usage of inventory items.

In some embodiments, the server 104 may receive 308 transaction records from a dispensing device 106 upon restoration of network connectivity. The transaction records are generated during offline operations and stored locally by the control circuit 114 in the dispensing device 106. The method includes updating central inventory records based on the received transaction data.

In various embodiments, the dispensing device 106 includes a scanner 118 interprets machine-readable codes representing dispensing instructions. The scanner 118 is coupled to the control circuit 114 to communicate which inventory items are removed from the dispensing device 106.

A method 400 for dispensing inventory items using remote devices is illustrated in FIG. 4. In this embodiment, the method 400 relates to a cloud-based vending control system designed to efficiently manage remote dispensing devices through a network. At the core of this system is a cloud-based server that communicates with multiple dispensing devices, each equipped with a control circuit and a memory storing a unique identifier linked to its dispensing mechanism and type. The server's capabilities include obtaining 402 this unique identifier from any connected dispensing device, associating 404 it with a customer account, and receiving 406 dispensing requests initiated by users via mobile or web interfaces. Upon receiving a request, the server transmits 408 operational instructions to the device's control circuit, triggering the dispensing mechanism to release the selected inventory item. A confirmation signal received 410 by the server from the control circuit then verifies the completion of the dispensing process.

Additionally, the server incorporates a database to store inventory-related data. It is further equipped to receive feedback from the control circuit, enabling it to confirm the removal of the selected item and update the inventory database accordingly. This feedback mechanism is supported by a feedback circuit on the dispensing device, which may include sensors, RFID, or user input to detect item removal.

The system's dispensing mechanism can either dispense the item directly or unlock a door to provide access. In cases where a discrepancy between the actual and recorded inventory is detected, the server can lock the dispensing device to prevent unauthorized access. The server also hosts a user interface accessible via mobile devices or web browsers, allowing users to initiate dispensing requests remotely. Furthermore, the server can provision the dispensing device by associating its unique identifier with its type, such as a locker, helix-style machine, or drawer cabinet.

The method 400 may be implemented with system 100 of FIG. 1. In accordance with the method 400, the cloud-based server 104 obtains 402 the unique identifier from a dispensing device of the one or more remote devices.

The cloud-based server 104 associates 404 the unique identifier with a customer account and the dispensing device 106. The unique identifier for the dispensing device can be associated with the customer account to store records in the cloud-based server of users dispensing from each dispensing device 106.

The cloud-based server 104 may be operable to provision the dispensing device 106 by associating the unique identifier with the dispensing device type. The dispensing device type may be selected from the group of a locker, helix-style machine, or drawer cabinet.

The cloud-based server receives 406 a dispensing request initiated by a user via a mobile or web-based interface. The dispensing request includes a selection of an inventory item. The cloud-based server 104 may be operable to host the user interface accessible via a mobile device or web browser to allow users to initiate dispensing requests from remote locations. The cloud-based server 104 may include a database to store data related to the inventory item and all inventory items stored in the dispensing device 106.

The cloud-based server transmits 408 operational instructions to the control circuit 114 of the dispensing device 106 to actuate the dispensing mechanism 110 for releasing the selected inventory item stored in the dispensing device 106. The actuation of the dispensing mechanism 110 may include dispensing the inventory item, e.g., helix dispensing devices, or unlocking a door to provide access to the inventory item, e.g., drawers and locker dispensing devices.

The cloud-based server receives 410 a confirmation signal from the control circuit indicating completion of the dispensing. In some embodiments, the method may include, maintaining, at the cloud-based server 104, inventory data corresponding to each dispensing device 106. The inventory may be stored in a database in the cloud. The cloud-based server 104 may monitor usage data received from each control circuit 114. The method may also include generating a reorder trigger when a depletion threshold is reached by the cloud-based server 104.

Figure 6:
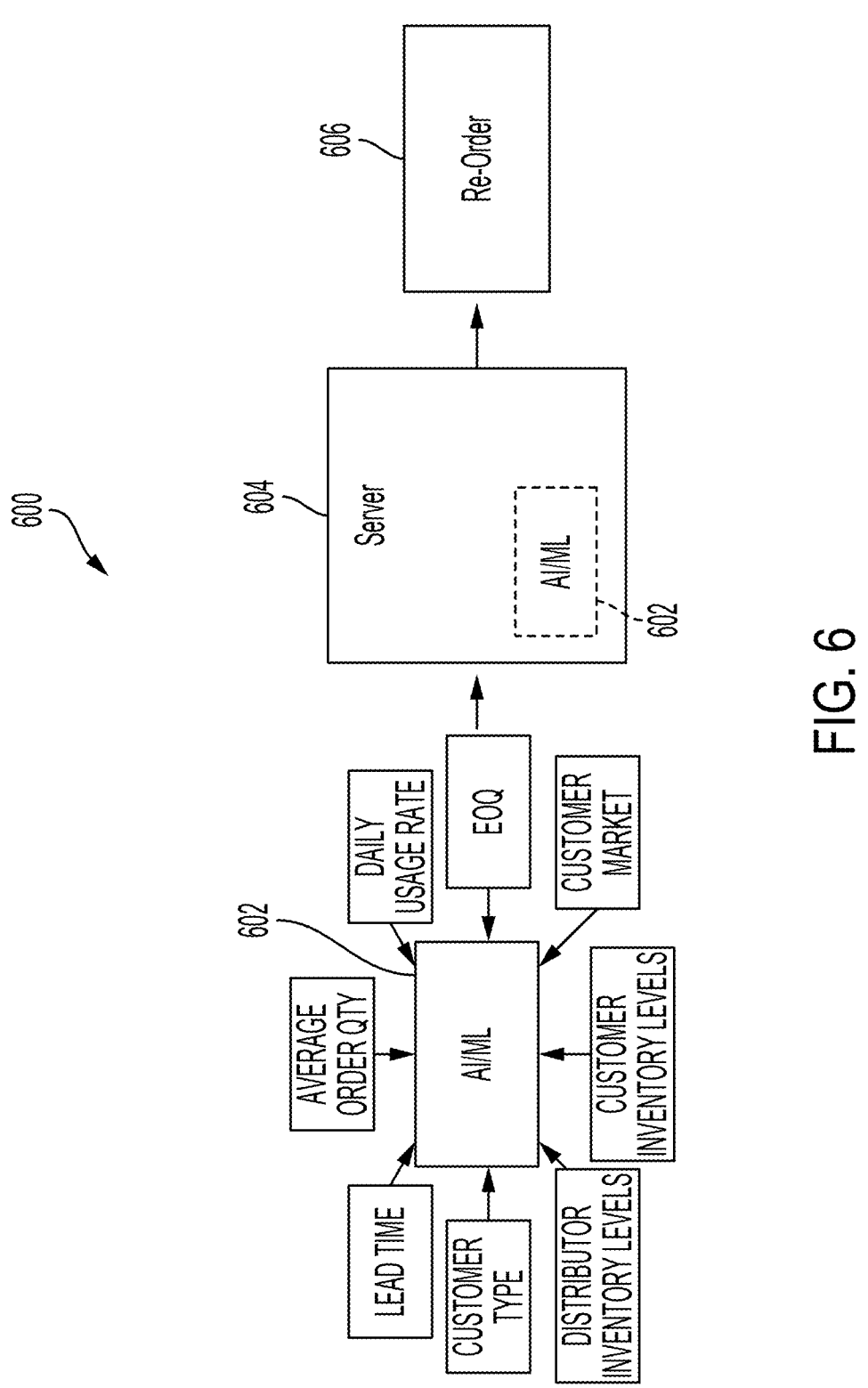
FIG. 6 illustrates an embodiment of a hardware environment of a cloud-based system, according to at least one aspect of the present disclosure.

For example, FIG. 6 illustrates a system 600 for determining reorders of inventory, according to an embodiment of the present disclosure. The server 604 may include the machine learning model/AI 602 or the machine learning model/AI 602 may be separate from cloud based server 604. The cloud-based server 604 and/or the AI/machine learning model 602 may determine the re-order 606. The re-order 606 may be the inventory items to be re-ordered and the number of each inventory item to be re-ordered.

The AI/machine learning model 602 may use a plurality of inputs to determine the re-order of inventory. For example, the inputs may be lead time, average order quantity, daily usage rate, economic order quantity (EOQ), customer market, customer inventory levels, distributor inventory levels, customer type, and other factors impacting the inventory.

The reorder trigger may be generated by executing a machine learning model at the cloud-based server 104. The model is trained using historical inventory and usage data to forecast reorder timing based on at least one of item lead time, consumption rate, current stock level, customer classification, or distributor inventory availability.

The reorder trigger may be generated based on a usage rate of inventory. The usage rate may be determined based on a rate at which inventory is depleted, as calculated from inventory stored in the memory. The usage rate may be based on the availability of items, such as reusable items all being unavailable during the day. This may indicate that more of those items may be necessary. The reorder quantity may be based on the operational cost of the item. The operational cost may be based on order cost, delivery cost, and material cost.

The reorder trigger may be a minimum value needed to keep in stock. This may be based on lead time and recent usage of the item. The reorder value may be based on both the reorder quantity and the minimum value needed to keep in stock. In some embodiments, these values are determined by a machine learning model. The machine learning model uses historical usage of inventory items.

With reference back to FIGS. 1 and 2, in some embodiments, the dispensing device 106 may include a feedback circuit 116 located on the dispensing device 106, wherein the feedback circuit 116 includes a sensor 117 such as for example, RFID device. The sensor 117 or user input may be operable to detect that the selected inventory item was removed from the dispensing device 106. The feedback circuit 116 may include a sensor, RFID, or user input is operable to detect that the selected inventory item was removed from the dispensing device.

The cloud-based server 104 may receive feedback from the control circuit 114 and determine, based on the feedback, that the selected inventory item has been removed from the dispensing device 106. The cloud-based server 104 updates the database for the inventory item after the item has been removed.

In some embodiments, the cloud-based server 104 determines that an inventory item is not dispensed. An inventory item may not be dispensed due to error in the dispensing. For example, where the door does not unlock, or the helix does not rotate, the item is not dispensed. In other examples, the wrong door may be unlocked, or the wrong item may be dispensed from the helix. This may occur due to errors in the location of inventory in the machine or mechanical failures within the dispensing device 106.

In some embodiments, the determination is based on a mismatch of inventory in the dispensing device 106 and inventory stored in the database. Based on the mismatch of inventory, the server 104 may send a signal to lock the dispensing device 106 to prevent further dispensing.

Figure 5:
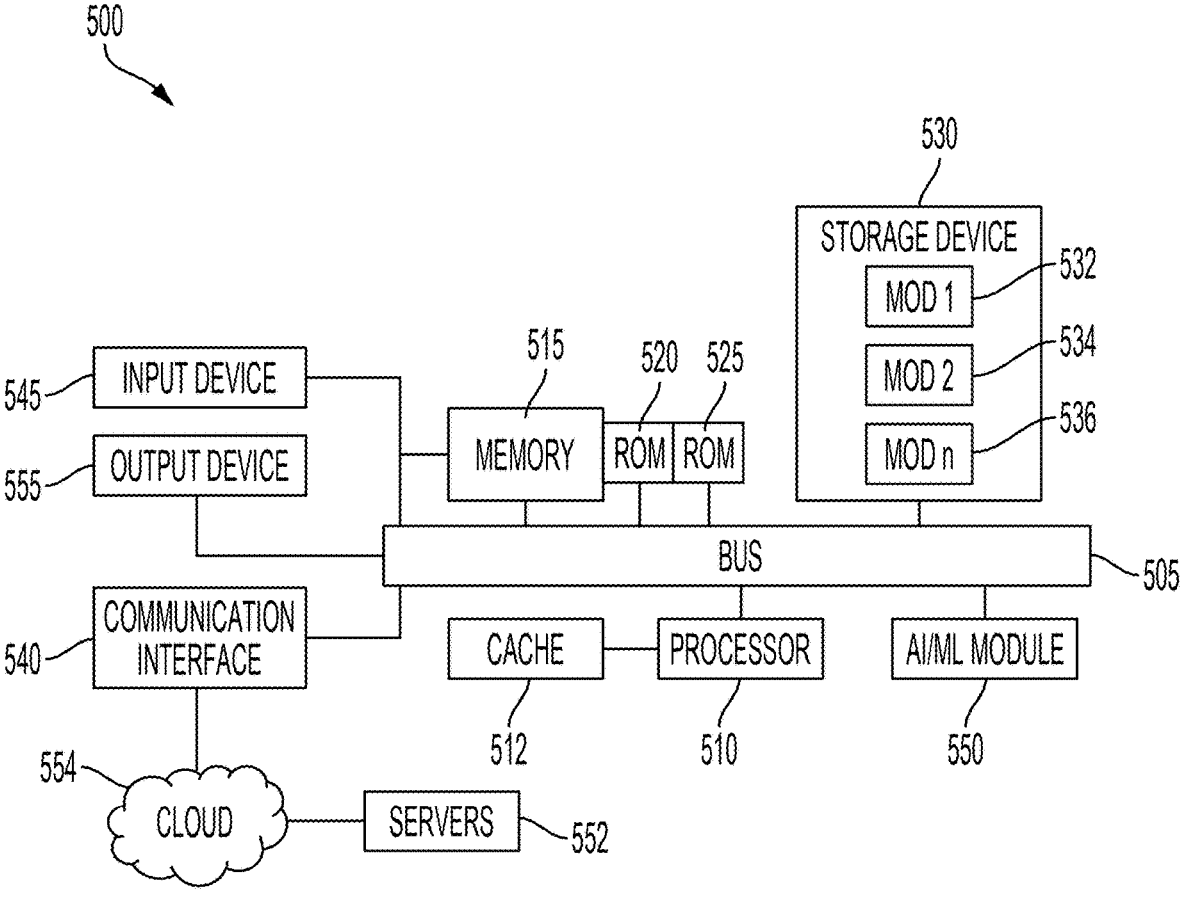
FIG. 5 illustrates an embodiment of a hardware environment of a computing system for cloud resource deployment, according to at least one aspect of the present disclosure.

FIG. 5 illustrates embodiment of a hardware environment of a computing system 500 for cloud resource deployment. The hardware environment of the computing system 500 is optimized for implementing the complex operations for cloud-based server 104 as described above in connection with FIGS. 1-4, integrating both a robust, modular hardware setup and a detailed processor-based computing system.

With reference to FIG. 5, the components of the hardware environment of the computing system 500 are in communication with each other using a system bus 505. The computing system 500 can include a processing unit (CPU or processor) 510 and a system bus 505 that may couple various system components including the system memory 515, such as a read only memory 520 (ROM) and random-access memory 525 (RAM), to the processor 510. The computing system 500 can include a cache 512 of high-speed memory connected directly with, in close proximity to, or integrated as part of the processor 510.

The computing system 500 can copy data from the system memory 515, ROM 520, RAM 525, and/or storage device 530 to the cache 512 for quick access by the processor 510. In this way, the cache 512 can provide a performance boost that avoids processor delays while waiting for data. These and other modules can control the processor 510 to perform various actions. Other system memory 515 may be available for use as well. The system memory 515 can include multiple different types of memory with different performance characteristics. The processor 510 can include any general-purpose processor and a hardware module or software module, such as module 1 532, module 2 534, up to module n 536 (where n is an integer greater than 2) stored in the storage device 530, to control the processor 510 as well as a special-purpose processor where software instructions are incorporated into the actual processor design. The processor 510 may essentially be a completely self-contained computing system, containing multiple cores or processors, a system bus, memory controller, cache, etc. A multi-core processor may be symmetric or asymmetric.

To enable user interaction with the computing system 500, an input device 545 can represent any number of input mechanisms, such as a microphone for speech, a touch-protected screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing system 500. The communications interface 540 can govern and manage the user input and system output. There may be no restriction on operating on any particular hardware arrangement and therefore the basic features here may easily be substituted for improved hardware or firmware arrangements as they are developed.

The storage device 530 can be a non-volatile memory and can be a hard disk or other types of computer readable media or storage which can store data that are accessible by a computer, such as magnetic cassettes, flash memory cards, solid state memory devices, digital versatile disks, cartridges, random access memory, read only memory, and hybrids thereof.

As discussed above, the storage device 530 can include the software modules 532, 534, 536 for controlling the processor 510. Other hardware or software modules are contemplated. The storage device 530 can be connected to the system bus 505. In some embodiments, a hardware module that performs a particular function can include a software component stored in a computer-readable medium in connection with the necessary hardware components, such as the processor 510, system bus 505, output device 535, and so forth, to carry out the function. For clarity of explanation, in some instances the present technology may be presented as including individual functional blocks including functional blocks comprising devices, device components, steps or routines in a method embodied in software, or combinations of hardware and software.

With reference to both FIG. 1 and FIG. 5, the disclosed cloud-based server 104 can operate within a sophisticated, processor-based computing environment, exemplified by the computing system 500, designed to orchestrate, optimize, and secure cloud resource deployment operations with real-time precision. Central to the cloud resource deployment system 100 is a high-performance processor 510, which coordinates essential functions across memory, storage, data inputs, and external networks via a system bus 505. Equipped with a dedicated cache 512, the processor 510 ensures rapid access and retrieval of critical data, minimizing latency and providing the computational capacity to process complex instructions related to task orchestration, inventory management, and order fulfillment including continuous AI-driven adjustments in task management, inventory tracking, and order fulfillment.

The computing system 500 includes a multi-tiered memory architecture where the system memory 515 includes both read-only memory 520 (ROM) and random-access memory 525 (RAM). One aspect of the computing system 500 is its multi-layered storage infrastructure, anchored by the storage device 530. This storage device 530 includes various forms of non-volatile memory, such as solid-state drives (SSDs) and magnetic storage, housing critical data and software modules 532, 534, 536 necessary for controlling the processor 510 and executing operations described in FIG. 1, for example. The storage device 530 stores complex software algorithms and machine learning models that analyze historical data and real-time conditions, generating optimized task sequences for each cloud resource.

This configuration supports high-speed processing for tasks and data updates essential for dynamic operations for cloud resource cloning. While the ROM 520 provides core operational protocols and configurations, the high-speed RAM 525 enables the system to handle real-time updates to inventory levels, task queues, and predictive analytics. Furthermore, a storage device 530, including SSDs and magnetic storage, houses critical data and software modules necessary for executing cloud-based server 104 functions described in conjunction with FIGS. 1-5. This storage system retains historical records, operational data, and machine learning models, enabling complex task sequencing and optimized inventory management.

Artificial intelligence (AI) and machine learning (ML) modules 550 may be embedded within the computing system 500 to improve various processes related to cloud resource deployment. For example, AI and ML modules 550 may operate to enhance user experience related to interactions with the dispensing device 106, perform predictive analytics regarding user requests, identify potential issues regarding cloud resource deployments, and provide recommendations to proactively address potential issues, as discuss further herein.

A suite of data collection and input/output (I/O) devices may be employed to monitor and interact with the cloud-based server system 100. Input devices 545, including barcode scanners, RFID readers, IoT sensors, touchscreens, and handheld devices, capture real-time data on inventory status, item locations, and environmental conditions. This data feeds into the processor 510 for seamless integration into the operational database, enabling precise, on-the-fly adjustments. Output devices, such as digital displays, wearable alerts, and screens, provide real-time feedback to personnel on inventory status and task priorities, ensuring that staff remain informed of critical updates and operational changes. The range of input and output devices, including the input device 545 and the output device 535, which enable users to interact directly with the cloud resource deployment system 100. These input devices 535 and output devices 555 provide real-time feedback and facilitate task monitoring, allowing users to stay informed of task progress, and any system updates. Input devices 545, such as touchscreens and scanners 118, capture real-time data from users and transmit it to the processor 510, while output devices 535 display prioritized task sequences, updates on order status, and notifications for operational adjustments.

In various embodiments, the computing system 500 is extended and supported by a cloud-based infrastructure 554, which provides scalable storage, processing power, and data analytics.

The cloud-based infrastructure 554 also serves as the primary hub for inter-facility communication, linking remote vending machines to a central command system that monitors and directs tasks across the network. When additional processing capacity is required, the system can dynamically allocate cloud resources, ensuring that computational workloads related to predictive analytics, complex task sequencing, and resource optimization are handled efficiently. Additionally, data redundancy protocols within the cloud architecture safeguard operational data, ensuring recovery from hardware failure or data loss scenarios.

The computing system 500 may be processor-based. The processor-based computing system operates within a cloud-enabled, modular hardware environment designed for scalability and high availability. This broader infrastructure includes additional AI-optimized processing units, such as TPUs and GPUs, which are capable of handling the intensive computational requirements of machine learning algorithms used for demand forecasting, slotting optimization, and real-time task adjustments. The modular cloud architecture ensures that each facility can access centralized data and processing power, dynamically adjusting workflows based on system demands. It also allows the orchestration module to allocate resources optimally, whether from central servers or distributed cloud resource-specific processors, depending on task priorities and operational constraints.

The scalable cloud-based infrastructure 554 provides flexible storage, processing, and analytics capabilities across distributed facilities. Cloud integration supports storage of historical data, remote processing of compute-intensive machine learning models, and real-time data access for multiple facilities. Managed through containerized applications and virtual machines, the cloud framework enables continuous software updates, enhanced disaster recovery, and dynamic resource allocation to accommodate varying operational demands. Cloud-based inter-facility communication ensures synchronized, efficient operations, with additional processing capacity allocated as needed.

Energy efficiency is also prioritized within the design of the cloud-based server system 100, with power management protocols integrated across hardware components to reduce the system's environmental impact. The distributed power architecture, supported by uninterruptible power supplies (UPS) and backup generators, ensures reliable operation and minimizes downtime, allowing the system to maintain continuity and efficiency during power disruptions.

The cloud-based server system 100 security protocols ensure data integrity, privacy, and compliance with regulatory standards. These include end-to-end encryption, multi-factor authentication, role-based access control, and real-time monitoring via firewalls and intrusion detection systems. An AI-based anomaly detection component monitors access patterns and data consistency, flagging unusual activities. Additionally, encrypted logging and audit trails facilitate transparency and compliance with regulations such as General Data Protection Regulation (GDPR) for data privacy, while data sovereignty protocols ensure that sensitive information meets regional compliance standards.

This computing system 500 represents an end-to-end, cloud-based server system 100 that is adaptive and integrates AI-driven analytics, real-time data capture, robust security measures, and scalable cloud resources. The processor 510, memory modules, storage devices, and I/O components collectively enable data-driven decision-making, adjusting tasks in real time to respond to changing demands. Data flows seamlessly from cloud storage and I/O devices to the central processor, dynamically orchestrating resources to provide real-time updates to staff, maintain efficiency, and optimize performance across facilities. This robust, secure, and compliant system is designed to streamline operations, improve responsiveness, and support scalable growth in diverse logistics environments.

In summary, this integrated computing environment 500 offers a comprehensive solution for the cloud-based server system 100 described in FIGS. 103, combining high-performance processing, advanced memory configurations, scalable cloud-based resources, and robust communication interfaces. It enables efficient and adaptive control over the entire fulfillment process, from inventory monitoring and task allocation to predictive analytics and order prioritization, ultimately facilitating efficient and responsive cloud resource cloning operations that meet complex and changing logistical demands. Together, these elements establish a high-performance environment that supports continuous adaptation, precise task orchestration, and predictive optimization, fully realizing the functionalities described in the appended claims.

The presently disclosed cloud resource deployment system 100 can harness advanced artificial intelligence (AI) technologies, integrating sophisticated machine learning models with cutting-edge computational infrastructure to solve complex problems, enhance decision-making, and execution of tasks across multiple cloud resources or cloud service providers. Designed with flexibility, scalability, and high-performance in mind, the system offers organizations a comprehensive AI solution tailored to their needs.

Referring to FIG. 1, in various embodiments, the server 104 may include an artificial intelligence (AI) module to enhance the functionality related to reordering inventory. A machine learning model may determine the reorder minimum and maximum. The AI module may employ an agentic AI model, such as an AI chatbot, to interact dynamically with the user through natural language processing (NLP). The AI module may engage in conversational dialogues with the user, prompting the user to provide inputs specifying the attributes of the cloud resource in a more intuitive and user-friendly manner. For example, the AI chatbot may ask clarifying questions or provide contextual guidance to ensure that the user provides complete and accurate information, such as resource type, cloud provider, or specific compute or storage attributes to reduce the occurrence of errors in the request process.

In various embodiments, the AI module may analyze the user's inputs to identify potential issues that could affect the successful deployment of the cloud resource. For example, the AI module may predict the inventory level and reordering quantity based on historical data, predefined rules, or machine learning models trained on prior deployment requests. If the AI module detects an issue, such as an incompatible combination of attributes (e.g., selecting an instance type unsupported by the chosen cloud provider or region), insufficient resource allocation for the specified workload, or missing inputs (e.g., encryption parameters for a storage resource), the AI module can identify these issues to the user. The AI module may present the identified issues to the user through a display, for example, via the AI chatbot or graphical alerts in the GUI.

In various embodiments, the AI module may recommend solutions to address the identified issues. For example, if the AI module identifies that the user's selected instance size is insufficient for the specified workload, it may suggest alternative instance types or configurations that align with the user's requirements. As another example, if optional or required information has not been specified by the user, such as a backup frequency for a storage resource, the AI module may proactively prompt the user to provide this input. The AI module may recommend a default value based on best practices or historical user preferences. The recommendations may be presented by the AI module via the AI chatbot in natural language or as interactive options within the intake form.

In various embodiments, the AI module may learn from user interactions and deployment outcomes to continuously improve its performance. For example, the AI module may employ reinforcement learning or supervised learning techniques to refine its ability to predict issues, recommend solutions, and guide users through the intake process. By analyzing patterns in user inputs, successful deployments, and failed requests, the AI module can adapt its prompts and recommendations to better align with user needs and cloud service provider constraints.

For example, by analyzing historical deployment data and the parameters in the structured request message, the orchestration AI module may predict the most efficient task order, anticipate potential bottlenecks, and dynamically adjust the workflow to minimize deployment time or resource conflicts. This predictive capability can ensure that the dispensing device 106 executes tasks in a manner tailored to the specific cloud resource attributes and target environment.

The orchestration AI module can employ continuous learning capabilities to enhance the performance of the dispensing device 106. For example, the orchestration AI module may analyze feedback from completed dispensing (e.g., success rates, error logs, and performance metrics) and implement updates, such as changes to task sequencing, resource invocation, and dependency management. Continuous learning by the orchestration AI module can ensure that the dispensing device 106 remains effective across diverse cloud environments and evolving user requirements, delivering robust and scalable cloud resource deployments.

The various AI modules of the cloud-based server 104 disclosed herein can leverage state-of-the-art deep learning models such as convolutional neural networks (CNNs) for image analysis, recurrent neural networks (RNNs) for sequential data, and transformer models for natural language processing (NLP).

Built on a microservices framework, the AI system offers scalability and flexibility. Each AI module may be deployed as an independent service, allowing organizations to scale and adjust components as necessary without affecting the entire system. This modularity ensures seamless updates and improvements over time.

The AI modules may dynamically connect with databases to process and analyze data originating from different sources as it enters the system. This feature empowers businesses to make data-driven decisions in real-time, adapting quickly to new information and evolving market conditions.

Equipped with advanced NLP capabilities, AI modules of the cloud-based server 104 can comprehend, interpret, and generate human language. This can enable applications like AI-driven customer service chatbots, sentiment analysis, and content generation, executing tasks that would otherwise require human input.

In addition to cloud infrastructure, the cloud-based server 104 can include edge computing capabilities, enabling real-time AI processing on local devices or servers. This reduces latency and allows critical applications—such as IoT networks, autonomous systems, and real-time monitoring—to function seamlessly without relying on constant cloud communication.

Optimized for high-performance computing environments, the cloud-based server 104 can utilize GPUs and TPUs to accelerate machine learning tasks, enabling the rapid processing of large datasets. This feature is especially beneficial for applications requiring intense computational power, such as video analytics, financial modeling, and real-time data processing.

Built with security, the cloud-based server 104 can feature end-to-end encryption and adheres to the latest privacy regulations. It includes continuous monitoring for anomalous behavior, ensuring that sensitive data is securely processed and stored in compliance with industry standards.

The server 104 can be deployed across a range of environments, including public or private cloud infrastructures, fully on-premise infrastructures, or a hybrid configuration that is deployed using a combination of cloud-based and on-premises infrastructures. This flexibility allows organizations to select the best deployment strategy based on their operational, security, and scalability needs.

The computing system 500 of one or more computers perform particular operations or actions by virtue of having software, firmware, hardware, or a combination of them installed on the system that in operation causes or cause the system to perform the actions. One or more computer programs perform particular operations or actions by virtue of including instructions that, when executed by data processing apparatus, cause the apparatus to perform the actions.

Within the context of this disclosure, the term "module" is used as a broad and flexible term to describe a component of the cloud resource deployment system that can be implemented using hardware, software, firmware, or a combination of these to perform one or more specific tasks or operations. A module may be implemented using various types of technology, including but not limited to:

Hardware: A physical device or circuit that executes predefined functions. Hardware modules may include, but are not limited to, processors (e.g., central processing units (CPUs), digital signal processors (DSPs), graphical processing units (GPUs)), memory components (RAM, ROM, flash memory), network interfaces, power management systems, or specialized chips such as application-specific integrated circuits (ASICs) or field-programmable gate arrays (FPGAs). These components may be connected through buses, networks, or communication interfaces, providing the necessary infrastructure for high-speed data transfer and execution of operations.

Software: A set of instructions stored in memory and executed by processing units. Software modules may include executable code, dynamic link libraries (DLLs), software development kits (SDKs), virtual machine environments, or applications. These modules are responsible for implementing algorithms, data processing, decision-making logic, and user interface functionalities. Software modules can be written in various programming languages (e.g., C++, Python, Java) and can interact with other modules through well-defined APIs, middleware, or cloud-based services.

Firmware: Low-level code stored in non-volatile memory (e.g., EEPROM, flash memory) that bridges the gap between hardware and higher-level software. Firmware modules provide the control logic necessary to configure, initialize, and manage hardware devices. Firmware can handle essential tasks such as device bootstrapping, protocol handling, and power management. Firmware updates may be delivered remotely, enabling post-deployment enhancements and security patches without requiring hardware modifications.

Modules are capable of interacting with other modules via inter-module communication within the system through standard communication protocols such as Inter-Process Communication (IPC), message passing, remote procedure calls (RPC), or data buses. This allows for distributed operations across different hardware or software environments, whether local or over a network. The use of APIs, middleware layers, or network protocols (e.g., REST, gRPC) facilitates seamless communication between modules regardless of their underlying implementation.

Modules are designed with modularity and scalability features via a plug-and-play architecture, enabling the system to dynamically add, remove, or modify modules as needed. This modularity allows the system to scale efficiently, either horizontally (by adding more modules for parallel processing) or vertically (by enhancing the capabilities of individual modules). This feature is particularly useful in distributed computing environments, such as cloud platforms or multi-core processors.

Modules can be designed to support multi-threading, parallel execution, or distributed computing architectures, where tasks are split across multiple hardware resources (e.g., multi-core processors, distributed nodes). Load balancing and task synchronization mechanisms ensure efficient resource utilization, minimizing execution time for complex operations.

Modules can integrate AI-driven components such as machine learning models or neural networks to perform tasks like pattern recognition, decision-making, and predictive analytics. These AI modules can be pre-trained models or dynamically updated through continuous learning, depending on the application's requirements. Modules can leverage specialized AI hardware accelerators such as TPUs (Tensor Processing Units) or GPUs for high-performance processing.

For time-sensitive applications, modules may feature real-time processing capabilities, including low-latency processing, task prioritization, and event-driven architectures. Real-time operating systems (RTOS) or real-time task schedulers can be used within firmware or software modules to ensure that critical tasks are completed within specific time constraints.

Modules may incorporate security mechanisms such as encryption, authentication, and access control to protect data and ensure the integrity of operations. Secure hardware modules (e.g., Trusted Platform Modules (TPMs) or secure enclaves) may be used to store cryptographic keys and execute secure operations, while software-based modules may implement firewalls, intrusion detection systems (IDS), or secure communication protocols (e.g., TLS/SSL).

Modules may manage and store data using embedded databases, cloud storage services, or other data management and persistence mechanisms. Data synchronization across distributed systems may be supported through version control, replication strategies, and consistency models (e.g., eventual consistency, strong consistency).

Modules are adaptable for deployment in cloud environments or edge computing frameworks. Cloud-based modules can dynamically scale according to demand, leveraging elastic resources, while edge modules perform low-latency processing closer to the data source, reducing dependency on centralized cloud systems.

In environments where power consumption is critical (e.g., IoT devices or battery-operated systems), modules may include energy-efficient designs, such as power-aware algorithms, dynamic voltage scaling, sleep modes, or energy harvesting technologies. Hardware modules may implement low-power designs using specific semiconductor technologies optimized for minimal energy usage.

Each module is designed to function as an independent, reusable component within a larger system architecture, while maintaining compatibility with other modules. This modular approach allows for flexibility in system design, enabling easy upgrades, extensions, and maintenance. Whether deployed on dedicated hardware, within virtualized environments, or across distributed networks, modules provide the foundational building blocks for the functionality of the cloud resource deployment system 100 comprehensive functionality.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical storage, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A cloud-based vending control system, comprising:
a cloud-based server to communicate with one or more remote dispensing devices over a network, each dispensing device comprising a control circuit coupled to a memory storing a unique identifier, wherein the control circuit being dynamically reassignable to a dispensing device, wherein the unique identifier is associated with a dispensing mechanism and dispensing device type based on the dispensing device the control circuit is assigned to, wherein the dispensing mechanism is one of a helix, lock, or door, wherein the cloud-based server is operable to:
obtain the unique identifier from a dispensing device of the one or more remote devices;
associate the unique identifier with a customer account and the dispensing device;
detect, a type of dispensing device type and a dispensing mechanism of the dispensing device;
select operational instructions based on the dispensing device type to operate the dispensing mechanism, wherein the operational instructions differ based on the dispensing mechanism;
receive a dispensing request initiated by a user via a mobile or web-based interface, wherein the dispensing request comprises a selection of an inventory item;
based on the dispensing device type, transmit the operational instructions to the control circuit of the dispensing device to actuate the dispensing mechanism for releasing the selected inventory item stored in the dispensing device; and
receive a confirmation signal from the control circuit indicating completion of the dispensing.

2. The system of claim 1, wherein the cloud-based server comprises:
a database to store data related to the inventory item.

3. The system of claim 2,
wherein the cloud-based server is operable to:
receive feedback from the control circuit;
determine, based on the feedback, that the selected inventory item has been removed from the dispensing device; and
update the database for the inventory item.

4. The system of claim 3, comprising a feedback circuit located on the dispensing device, wherein the feedback circuit comprises: a sensor, RFID, or user input is operable to detect that the selected inventory item was removed from the dispensing device.

5. The system of claim 1, wherein the actuation of the dispensing
mechanism comprises: dispensing the inventory item; or unlocking a door to provide access to the inventory item.

6. The system of claim 1, wherein the cloud-based server is operable to host the user interface accessible via a mobile device or web browser to allow users to initiate dispensing requests from remote locations.

7. The system of claim 2, wherein the cloud-based server is operable to:
determine that the inventory item is not dispensed, wherein the determination is based on a mismatch of inventory in the dispensing device and inventory stored in the database; and
based on the mismatch of inventory, locking the dispensing device.

8. The system of claim 1, wherein the cloud-based server is operable to:
instruct the user which vending machines have the item available; and receive a communication from the user indicating which of the available vending machines the user chose.

9. The system of claim 1, wherein the cloud-based server is operable to:

determine the closest vending machines to the user with the item available; and instruct the user to use the identified closest vending machine.

10. The system of claim 1, based on the dispensing device not receiving instructions to dispense an item:

the cloud-based server is operable to: transmit data to the user device; and the user device is operable to generate a quick response (QR) code based on the data from the server, wherein the quick response code includes the item and the instructions for dispensing; and the dispensing device is operable to scan the QR code and dispense the items based on the instructions.

11. A cloud-based method for dispensing inventory items using remote dispensing devices, the method comprising:

receiving, at a cloud-based server, a user-initiated dispensing request from a web or mobile interface, wherein the dispensing request includes a selected inventory item;

identifying a remote dispensing device associated with a control circuit and a unique identifier, wherein the dispensing device comprises a control circuit coupled to a memory storing a unique identifier associated with a dispensing mechanism and machine type based on the dispensing device the control circuit is assigned to, wherein the control circuit being dynamically reassignable to a dispensing device;

detect, the type of dispensing device and the dispensing mechanism of the dispensing device;

select operational instructions based on the dispensing device type to operate the dispensing mechanism, wherein the operational instructions differ based on the dispensing mechanism;

based on the dispensing device type, transmitting, from the cloud-based server to the identified dispensing device, the operational instructions to the control circuit of the identified dispensing device to actuate the dispensing mechanism for releasing the selected inventory item stored in the dispensing device; and receiving, at the cloud-based server, a confirmation message from the control circuit indicating that the dispensing has occurred.

12. The method of claim 11, comprising:

maintaining, at the cloud-based server, inventory data corresponding to each dispensing device;

monitoring usage data received from each of the control circuits; and generating a reorder trigger when a depletion threshold is reached.

13. The method of claim 12, wherein generating the reorder trigger comprises:

executing a machine learning model at the cloud-based server, wherein the machine learning model is trained using historical inventory and usage data to forecast reorder timing based on at least one of:

item lead time, consumption rate, current stock level, customer classification, or distributor inventory availability.

14. The method of claim 11, comprising receiving transaction data from a dispensing device upon restoration of network connectivity, wherein the transaction data is generated during offline operations and stored locally by a hardware controller in the dispensing device; and updating central inventory records based on the received transaction data; and wherein the dispensing device comprises a scanner operable to interpret machine-readable codes representing dispensing instructions.

15. A cloud-based vending control system, comprising:

a cloud-based server to communicate with a remote dispensing device over a network;

the remote dispensing device comprising:

a dispensing mechanism;

a memory storing a unique identifier associated with the dispensing mechanism and dispensing device type based on the dispensing device the control circuit is assigned to, wherein the dispensing mechanism is one of a helix, lock, or door;

a control circuit coupled to the memory, wherein the control circuit is operable to:

execute operational instructions from the cloud-based server, wherein the control circuit being dynamically reassignable to a dispensing device;

wherein the cloud-based server is operable to:

obtain the unique identifier from the dispensing device;

associate the unique identifier with a customer account and the dispensing device;

detect, the type of dispensing device and the dispensing mechanism of the dispensing device;

select operational instructions based on the dispensing device type to operate the dispensing mechanism, wherein the operational instructions differ based on the dispensing mechanism;

receive a dispensing request initiated by a user via a mobile or web-based interface, wherein the dispensing request comprises a selection of an inventory item;

based on the dispensing device type, transmit the operational instructions to the control circuit of the dispensing device to actuate the dispensing mechanism for releasing the selected inventory item stored in the dispensing device; and receive a confirmation signal from the control circuit indicating completion of the dispensing.

16. The system of claim 15, wherein the cloud-based server comprises:

a database to store data related to the inventory item.

17. The system of claim 16, wherein the remote dispensing device comprises a feedback circuit; and wherein the cloud-based server is operable to:

receive feedback from the feedback circuit;

determine, based on the feedback, that the selected inventory item has been removed from the dispensing device; and update the database for the inventory item.

18. The system of claim 17, wherein the feedback circuit comprises: a sensor, RFID, or user input is operable to detect that the selected inventory item was removed from the dispensing device.

19. The system of claim 18, wherein the actuation of the dispensing mechanism comprises: dispensing the inventory item; or unlocking a door to provide access to the inventory item.

20. The system of claim 16, wherein the cloud-based server is operable to:

determine that an inventory item is not dispensed, wherein the determination is based on a mismatch of inventory in the dispensing device and inventory stored in the database; and based on the mismatch of inventory, locking the dispensing device.

\* \* \* \* \*